UNITED STATES PATENT OFFICE.

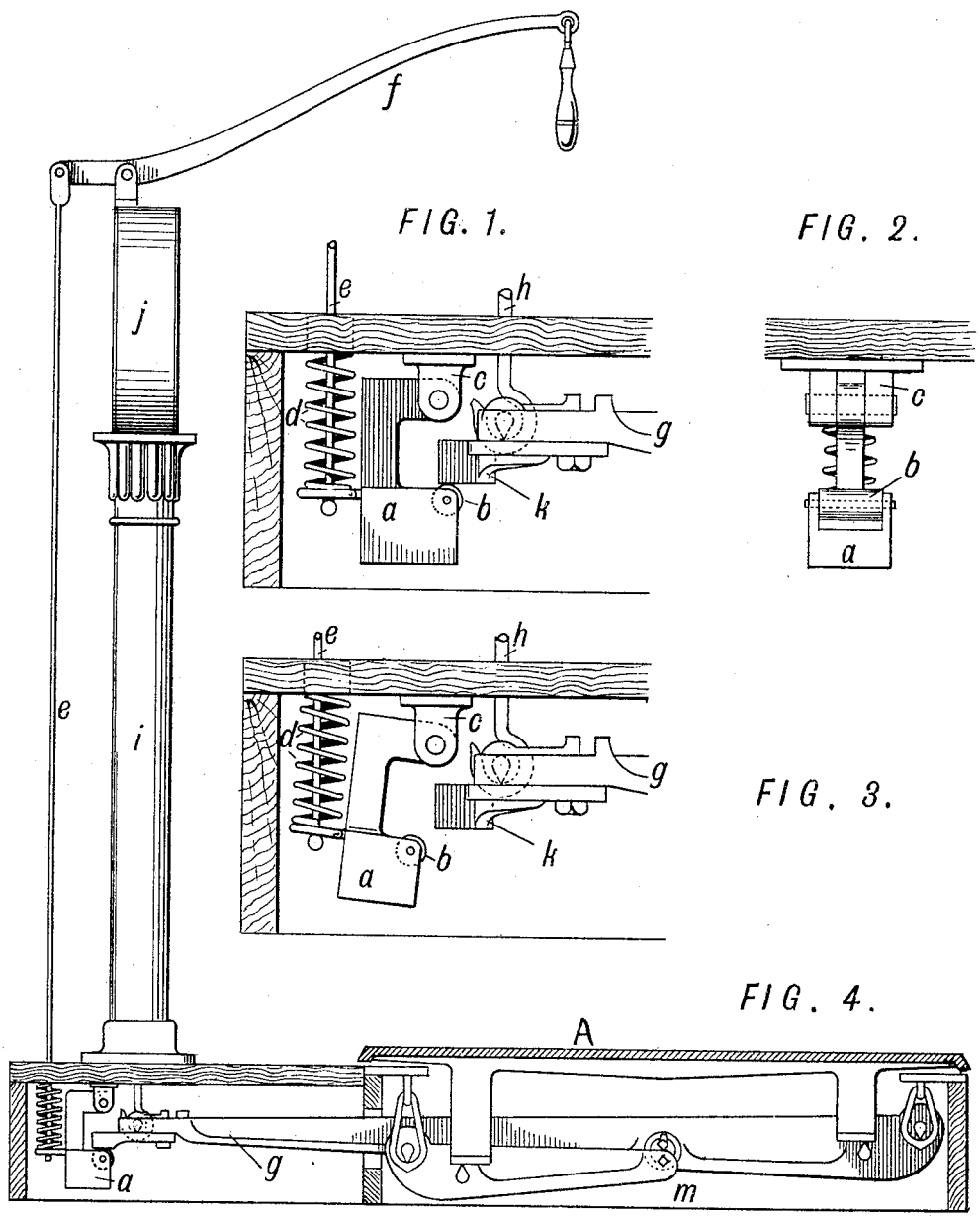

PERLEY F. HAZEN, OF ST. JOHNSBURY, VERMONT, ASSIGNOR TO THE
E. & T. FAIRBANKS & CO., OF SAME PLACE.

RELIEVING-GEAR FOR SCALES.

SPECIFICATION forming part of Letters Patent No. 673,261, dated April 30, 1901.

Application filed November 29, 1899. Serial No. 738,656. (No model.)

*To all whom it may concern:*

Be it known that I, PERLEY F. HAZEN, a citizen of the United States, residing at St. Johnsbury, in the county of Caledonia, State of Vermont, have invented certain new and useful Improvements in Relieving-Gear for Scales, of which the following is a description, reference being had to the accompanying drawings and to the letters of reference marked thereon.

My invention relates to an improvement in scales, and particularly to a relieving-gear for such, whereby the main beam may be manipulated to take all strain off the steelyard-rod until it is desired to weigh.

As herein shown, the invention is applied for relieving the steelyard-rod and spring of the scale illustrated in patent granted H. Paddock January 31, 1899, No. 618,520, but of course is not necessarily limited to a scale of that particular construction.

The invention consists, primarily, of a relieving-gear for scales having a lever adapted to engage and lift the main beam out of operative engagement with the steelyard-rod.

Secondly, it consists of a relieving-gear for scales having a swinging lever adapted to engage and lift the main beam out of operative engagement with the steelyard-rod.

Thirdly, it consists in the matters hereinafter described, and referred to in the appended claims.

The invention is illustrated in the accompanying drawings, in which—

Figure 1 is a detail view of a portion of a scale, showing the relieving device in operation. Fig. 2 is a rear view of the swinging relieving-lever. Fig. 3 is a view similar to Fig. 1, with the relieving device out of operation. Fig. 4 is a side elevation, partly in section, of an excess-baggage scale embodying my invention.

In the drawings, A represents the platform of the scale; $m$, the framework; $i$, the post; $j$, the dial-supporting framework on top of the post; $h$, the steelyard-rod, and $g$ the main lever, having the knife-edge bearings resting in the hook on the lower end of the steelyard-rod. In the piling of loads upon the platform strain and shock are transmitted from the lever $g$ to the rod $h$, and thus to the spring (not shown) in the dials. To obviate this and support the main lever $g$ off its supporting-hook on the lower end of the steelyard-rod is the purpose of this invention. To the forward end of the lever $g$ is secured a block $k$, having a flat under surface.

Pivoted to the hanger $c$ on the under side of the scale-frame is a lever carrying a block $a$, which supports a roll $b$. This lever is so hung that in normal condition the roll $b$ rides under the face of the block $k$ and slightly raises the end of the main lever, thus relieving the strain on the steelyard-rod and placing it on the block $a$.

To allow for manipulation of the lever by the operator to allow weighing to be accomplished, a rod $e$ is attached at one end to a projection on the lever, this rod at its upper end being connected to the pivoted hand-lever $f$. A spring $d$, surrounding the rod between the top of the scale-woodwork and the projection on the lever, keeps the roll $b$ normally engaged with the block $k$.

The operation is as follows: The load is run onto the platform of the scale, and then the operator pulls down arm $f$ by means of the wooden handle, which drawing through the rod $e$ pulls the block, with roll $b$, from under the flat lower surface $k$, and thus brings the strain upon the steelyard-rod and the spring permitting the pointer to indicate how much load is on the platform. After the load has been weighed the operator simply lets go of the handle, when the spiral spring $g$ forces the block $a$ back into position under the end of the lever with its flat lower surface, the roll $b$ being simply to avoid friction in process of this operation. The lever is raised just a little and enough to relieve the scale and no matter how much load is piled upon the platform will remain in that position until the rod $f$ is pulled down again.

It will be understood that so far as the broad idea of this invention is concerned I do not wish to be limited to the details shown, as various minor modifications and changes may be made without departing from the spirit of my invention.

Having thus described my invention, what I claim, and desire to secure by Letters Patent, is—

1. A relieving-gear for scales, comprising a moving part normally engaging the main lever and supporting it out of operative engagement with the weighing mechanism, with means under the control of the operator for positively releasing the same; substantially as described.

2. In a scale, the combination with the platform, steelyard-rod and main lever, a relieving-gear comprising a moving part supported beneath the scale-platform and adapted to engage and lift the main lever out of engagement with the steelyard-rod; substantially as described.

3. A relieving-gear for scales, comprising a spring-actuated lever normally engaging and supporting the main lever out of operative engagement with the weighing mechanism, and means for disengaging said lever from the main lever; substantially as described.

4. A relieving-gear for scales, comprising a spring-actuated pivoted lever normally engaging and supporting the main lever out of operative engagement with the weighing mechanism, and means for disengaging said lever from the main lever; substantially as described.

5. A relieving-gear for scales, comprising a swinging lever, a roll carried thereby, a spring normally holding the lever so that the roll is beneath the main lever of the scale, and means acting on the lever so as to remove the roll from engagement with the main lever; substantially as described.

6. A relieving-gear for scales, comprising the block $a$, pivoted to the scale-frame, a main scale-lever with which said block normally engages to slightly raise said main lever, and means for manipulating said pivoted block to cause it to release said main lever; substantially as described.

In testimony whereof I affix my signature in presence of two witnesses.

PERLEY F. HAZEN.

Witnesses:
ALBERT L. FARWELL,
JASON M. CADY.